July 21, 1959 R. C. CURTIS 2,896,097
POWER SUPPLY FOR DICTATING MACHINE AND THE LIKE
Filed Sept. 18, 1957 2 Sheets-Sheet 1
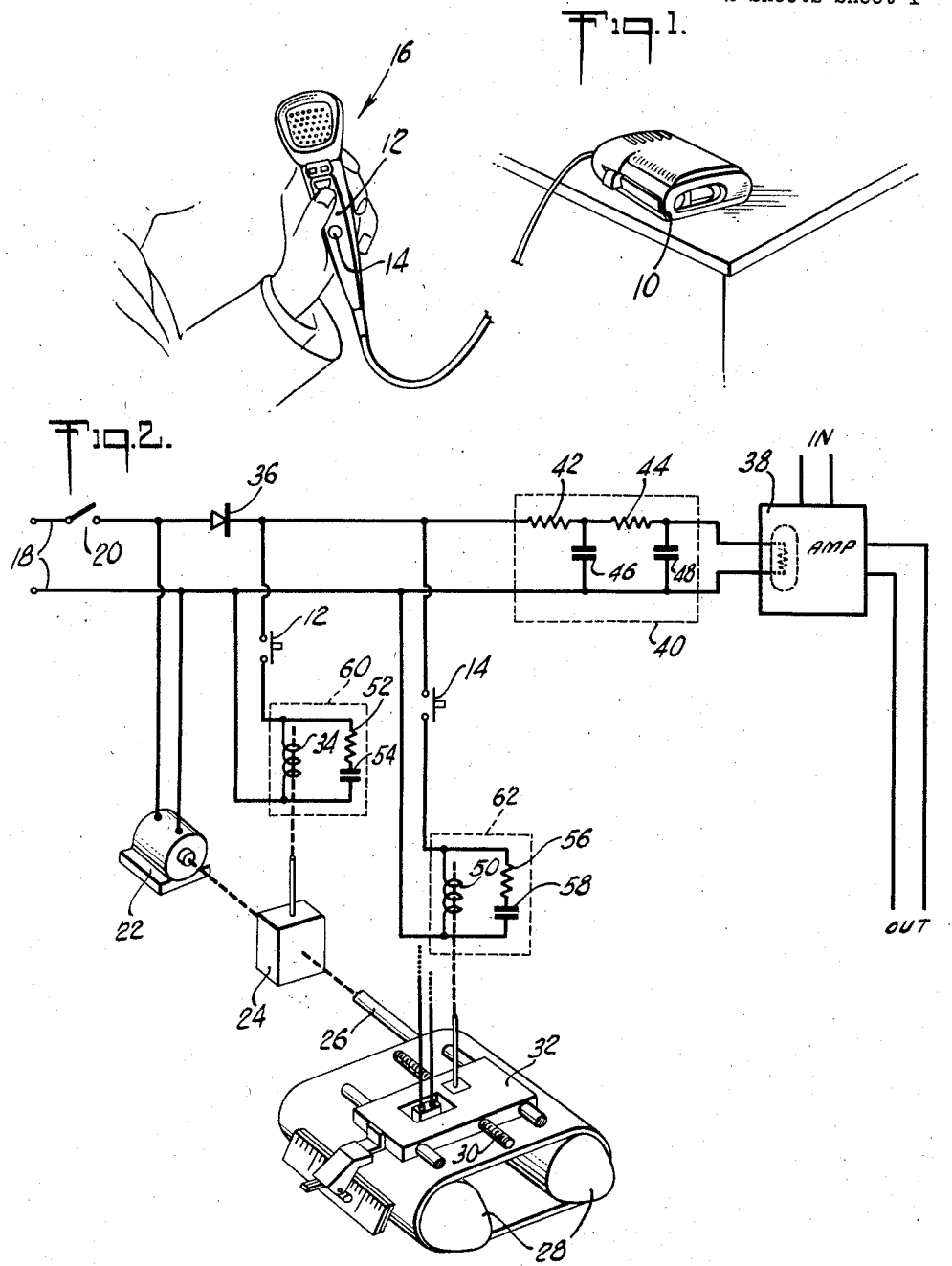
INVENTOR
ROGER C. CURTIS
BY
ATTORNEYS July 21, 1959  R. C. CURTIS  2,896,097
POWER SUPPLY FOR DICTATING MACHINE AND THE LIKE
Filed Sept. 18, 1957  2 Sheets-Sheet 2

INVENTOR
ROGER C. CURTIS
BY
Curtis Morris & Safford
ATTORNEY

United States Patent Office 2,896,097
Patented July 21, 1959

2,896,097
POWER SUPPLY FOR DICTATING MACHINE AND THE LIKE

Roger C. Curtis, New Haven, Conn., assignor to Dictaphone Corporation, Bridgeport, Conn., a corporation of New York Application September 18, 1957, Serial No. 684,737

5 Claims. (Cl. 307—150)

This invention relates to an improved power supply for a dictating or transcribing machine and the like.

An object of this invention is to provide a compact and inexpensive direct-voltage power supply circuit able to supply a constant voltage to a steady load even though heavy intermittent loads are being switched onto and off of the circuit.

Another object is to provide such a power supply which can be energized from either alternating or direct-current power lines and which in either case gives the same direct output voltage.

In designing a high-quality dictating machine, there has existed a difficult problem of providing satisfactory means for supplying a reasonably constant and well-filtered direct voltage to the machine's electrical amplifier which increases the electrical audio signals to a useful level. Commonly, this direct voltage is obtained through a rectifier connected in series with the power line and the amplifier load, the output voltage from the rectifier being filtered by one or more large capacitors in conjunction with dropping or surge resistors.

A voltage supply circuit can be arranged so that, regardless of whether the power line voltage applied to it is alternating or direct, the output voltage will stay at a constant level, provided of course that the load current remains consant. If there were no variations in load therefore, there would be no difficulty in making a power supply balanced for both A.C. and D.C. operation. However, in a dictating machine, remote control operation of the functions of the machine, such as start, stop, and playback are generally accomplished by means of electric solenoids inside the machine actuated by switches positioned externally within easy reach of the operator, as for example incorporated in a combination hand-size microphone-loudspeaker. Such solenoids require sizeable energizing signals and these, for practical reasons, such as the need to minimize hum pickup in the amplifier, should be direct currents. It is therefore the usual practice to power these solenoids from a direct-voltage source.

Previously the control solenoids were energized either through the same rectifier circuit which supplied the audio amplifier in the dictating machine or else were powered from a separate rectifier and filter. In the first case, the heavy intermittent currents drawn by these solenoids caused undesirable fluctuations in the voltage supplied to the amplifier and in the second case the additional rectifier circuit was an added expense and perhaps more importantly took up too much otherwise valuable space in the machine. Accordingly, some way of energizing the control solenoids from the same rectifier circuit used by the amplifier but without causing harmful variations in voltage was very much needed. The present invention fulfills this need.

In accordance with the present invention a single rectifier is arranged, in combination with surge or balancing resistors and filter capacitors of specially chosen values, to supply a substantially constant direct voltage to an amplifier load while at the same time supplying heavy intermittent currents for controlling various functions of a dictating machine and the like. The circuit is balanced for either A.C. or D.C. operation and gives an output direct voltage which is effectively constant for either, so long as the power line voltage suplied to the circuit is constant.

A better understanding of the invention together with a fuller appreciation of its many advantages will best be gained from a study of the following description given in connection with the accompanying drawings in which:

Figure 1 is an illustration of a dictating machine remotely operated from a hand microphone unit;

Figure 2 is a semi-diagrammatic showing of parts of the machine shown in Figure 1 together with an electrical circuit embodying features of the invention;

Figure 3:
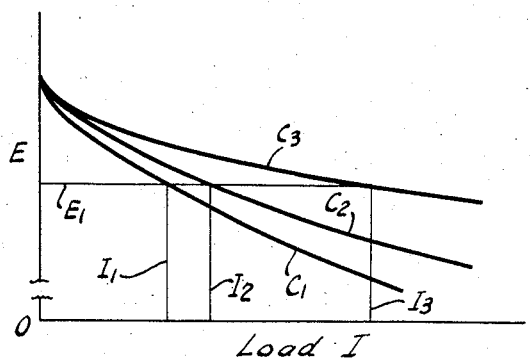
Figure 3 is a graph representing typical voltage versus load current curves for a capacitor-input halfwave rectifier D.C. power supply.

The dictating machine 10 shown in Figure 1 is arranged for remotely controlled start-stop and playback operation by actuation of corresponding start-stop and playback switches 12 and 14 carried on the hand microphone unit 16.

As seen in Figure 2, machine 10, parts of which are shown in exploded relation, is supplied with power from an A.C. line 18 through the main switch 20 of the machine. Connected through this switch to the line is a drive motor 22 which, while the switch is closed, rotates continuously. The drive shaft of motor 22 is coupled through a clutch unit 24 to the main drive shaft 26 of the machine which in turn rotates the record-supporting mandrels 28 on which is mounted a record 29. Shaft 26 also drives the feed screw 30 on which is mounted a carriage 32. This carriage supports the recording and playback heads (not shown) which scan the record laterally as it rotates past them thereby tracing out a helical track on the record.

Clutch 24 is controlled electrically through a solenoid coil 34 which is supplied with direct current from the rectifier 36, this rectifier in turn being connected through switch 20 to the A.C. line 18. When the solenoid coil is energized by the closing of start-stop switch 12, connected between the coil and rectifier 36, clutch 24 is operated to connect the main shaft 26 with the motor 22.

Also supplied with rectified current by rectifier 36 is the eletcrical amplifier 38 of the machine which draws a steady current at all times when the machine is on. The rectified current fed from rectifier 36 to amplifier 38 is filtered by a resistor-capacitor network 40 comprising the resistors 42 and 44 and the capacitors 46 and 48. The values of these resistors and capacitors are chosen so that the proper voltage is supplied to amplifier 38 and so that the magnitude of this voltage remains substantially constant regardless of whether power line 18 supplied direct or alternating voltage. As will appear, the voltage supplied to amplifier 38 remains constant even though sizeable loads, such as solenoid 34, are intermittently switched onto the common rectifier 36.

In the dictating machine illustrated, playback of the last few words of dictation is accomplished by pressing switch 14 which is connected in series with rectifier 36 and a solenoid coil 50. This coil, when energized, actuates a solenoid which by conventional means not shown herein switches the input of amplifier 38 from the microphone to the pickup head of the machine and simultaneously switches the output of the amplifier from the recording head to the microphone which then serves as a loudspeaker.

It is desirable to supply each of coils 34 and 50 with suitably filtered direct current, since this will minimize hum pickup in the amplifier which is connected to microphone unit 16 by a common cable including the leads to switches 12 and 14. To this end, coil 34 is shunted by a resistor 52 and a capacitor 54 in series, and coil 50 is shunted by a resistor 56 and a capacitor 58 in series.

Coil 34, resistor 52 and capacitor 54 together comprise a network 60 arranged to prevent any change in direct voltage supplied to amplifier when the switch 12 is closed, provided that (as is usual) the voltage drop across rectifier 36 is very low and remains substantially constant under the different loads applied. Coil 50, resistor 56 and capacitor 58 comprise a similar network 62. The operation of networks 60 and 62 will be explained in the following discussion.

Figure 3 shows a typical family of curves for a capacitor-input rectifier circuit with D.-C. load current I plotted along the abscissa and direct voltage E across the load plotted along the ordinate. For a given value of capacitance and surge resistor, the voltage will decrease along the curve $C_1$ with increasing current. For a higher value of capacitance, the voltage will decrease less rapidly along the curve $C_2$ and for a still higher capacitance, still less rapidly along curve $C_3$ and so on. For a further detailed analysis of such rectifier circuits, reference is made to Chapter VI of "Applied Electronics" by M. I. T. staff members, published by John Wiley, 1943.

Considering now that the Figure 3 curves relate specifically to the network 40 and rectifier 36, and assuming that the amplifier draws a current $I_1$, then there is some value of filter capacitance (i.e. capacitors 46 and 48 in combination) which will result in the desired voltage $E_1$. If switch 12 is subsequently closed, so as to draw a higher total load current $I_2$ through rectifier 36, then the desired voltage $E_1$ can be obtained by using a somewhat higher filter capacitance. And if switch 14 is closed to produce a still higher load the voltage $E_1$ can be maintained by using yet another value of filter capacitance.

The networks 60 and 62 are arranged to provide the additional filter capacitance (by means of the capacitors 54 and 58) required to compensate for the increased load they place on the rectifier 36 when the respective switches 12 and 14 are closed. Thus, the voltage at the cathode of rectifier 36 will remain at a constant direct voltage whether networks 60 and 62 are connected in circuit or not. Since the direct voltage at the cathode of rectifier 36 remains constant, the direct voltage applied to amplifier 38 remains constant.

In a circuit like that shown in Figure 2 which has been built and successfully operated, the voltage on line 18 was 117 volts, either D.C. or A.C. (25 cycles to 400 cycles; rectifier 36 was a Sarkes-Tarzian type M–500; amplifier 38 drew 10 ma. at 15 volts; clutch solenoid coil 34 had a resistance of 4,800 ohms and drew 24 ma.; playback coil 50 had a resistance of 1200 ohms and draw 96 ma.; the direct voltage at the cathode of rectifier 36 was 116 volts; resistor 42 was 1,000 ohms; resistor 44 was 9,000 ohms; capacitor 46 was 60 microfarads; capacitor 48 was 150 microfarads; resistor 52 was 330 ohms; capacitor 54 was 4 microfarads; resistor 56 was 330 ohms; and capacitor 58 was 10 microfarads.

Figure 4:
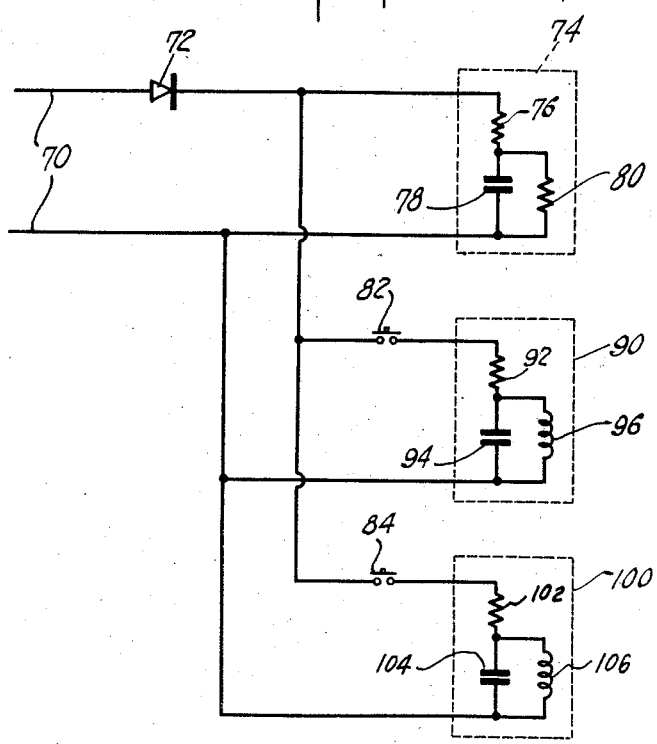
Figure 4 shows another circuit embodying features of the invention.

Figure 4 is a diagram of another circuit embodying features of the invention. Here, a power line 70 is connected in series with a rectifier 72 to a network 74 which includes a surge resistor 76, a filter capacitor 78 and a load 80, which load may be the amplifier in a dictating machine, for example.

Connected in parallel with network 80 through switches 82 and 84 are two networks 90 and 100, respectively, the first network including a surge resistor 92, a filter capacitor 94 and a coil 96 which may correspond to solenoid coil 34 in Figure 1. Network 100 in Figure 4 consists of a surge resistor 102, a filter capacitor 104 and a coil 106 which may correspond to relay coil 50 in Figure 1. In this arrangement, the capacitors 94 and 104 serve to compensate for the increased load when switches 82 and 84 are closed, and maintain the D.C. voltage fed to the network 74 constant.

It will be noted that in Figure 4 the surge resistors are in series with their respective coils and rectifier 72. Thus the ripple voltage applied to the coils is reduced below what it would be in Figure 2, for example. However, the corresponding direct voltage applied to the coils in Figure 4 is lower than the voltage applied in Figure 2 and there is less damping of switching currents in Figure 4 than in Figure 2.

The above description of the invention is intended in illustration and not in limitation thereof. Various changes may occur to those skilled in the art and these may be made without departing from the spirit or scope of the invention as set forth.

I claim:

1. Dictating machine apparatus of the character described comprising an electronic amplifier for the dictating machine, said amplifier requiring a substantially constant voltage and constant current, a rectifier connected in series with said amplifier to supply thereto a direct voltage from a source of power, an operating coil in the machine which requires a substantial current for energization, a switch adapted selectively to connect and disconnect said coil across said rectifier in parallel with said amplifier, and capacitance means connected permanently across said operating coil and adapted to compensate for the increased load represented by said coil whereby the direct voltage supplied by said rectifier to said amplifier does not change when said switch connects said coil across said rectifier.

2. Apparatus of the character described comprising an electronic amplifier for a dictating machine requiring substantially constant current and voltage, first resistor-capacitor filter means connected to said amplifier, rectifier means to supply said amplifier and filter means with a direct voltage of predetermined magnitude, said direct voltage having a given value dependent upon the parameters of said filter means, a relatively high-current device for performing an operation such as backspace and clutch control in said dictation machine and adapted to be connected intermittently across said rectifier means, a switch for alternatively connecting and disconnecting said device across said rectifier, and second resistor-capacitor filter means permanently connected to said device and proportioned with respect to the current drawn by it such that in the absence of said amplifier the direct voltage supplied to said device by said rectifier means will be the same as said predetermined magnitude.

3. The apparatus as in claim 2 wherein said first filter means comprises a resistor connected in series with said amplifier and said rectifier means and a capacitor connected in shunt with said amplifier and in series with said resistor, the size of said resistor and the size of said capacitor being proportioned so that the voltage supplied to said amplifier is the same whether alternating or direct power is supplied to said rectifier means.

4. The apparatus as in claim 2 wherein there are a plurality of said devices each having its own respective resistor-capacitor filter means connected to it and proportioned with respect to the current drawn so that whether none, some, or all of said loads are connected across said rectifier means along with said amplifier, the direct voltage applied to said amplifier will remain substantially constant.

5. An improved direct-current power supply and load circuit arrangement comprising a first load to which it is desirable to apply a substantially constant voltage, first capacitance filter means connected to said load, rectifier means to supply said load and filter means with a steady direct voltage, said direct voltage having a given value dependent upon the parameters of said filter means and load, a second relatively high current load adapted to be connected to said rectifier means, a switch for alternatively connecting and disconnecting said second load to and from said rectifier means, and second capacitance filter means associated with said second load and adapted to be connected and disconnected along with it to said rectifier means, said second capacitance filter means being proportioned with respect to said loads and said first capacitance filter means so that the direct voltage applied to said first load remains substantially the same both when said second load is connected to said rectifier means and when said second load is disconnected from said rectifier means.

References Cited in the file of this patent

UNITED STATES PATENTS 2,789,235     Shoaf _____ Apr. 16, 1957